United States Patent [19]

Wolfe et al.

[11] Patent Number: 5,563,734
[45] Date of Patent: Oct. 8, 1996

[54] DURABLE LOW-EMISSIVITY SOLAR CONTROL THIN FILM COATING

[75] Inventors: Jesse D. Wolfe, San Ramon, Calif.; Abraham I. Belkind, North Plainfield, N.J.; Ronald E. Laird, Benecia, Calif.

[73] Assignee: The BOC Group, Inc., Murray Hill, N.J.

[21] Appl. No.: 337,686

[22] Filed: Nov. 10, 1994

Related U.S. Application Data

[63] Continuation of Ser. No. 54,521, Apr. 28, 1993, abandoned.

[51] Int. Cl.$^6$ .................................. F21V 9/04; G02B 1/10
[52] U.S. Cl. ........................ 359/360; 359/584; 359/585; 359/589; 427/163.1; 204/192.27; 204/298.21
[58] Field of Search ..................................... 359/359, 360, 359/580, 584, 585, 589; 427/163.1, 167; 204/192.27, 298.21

[56] References Cited

U.S. PATENT DOCUMENTS

| | | | |
|---|---|---|---|
| 3,682,528 | 8/1972 | Apfel et al. | 359/360 |
| 3,758,185 | 9/1973 | Gelber | 359/360 |
| 3,978,272 | 8/1976 | Donley | 428/434 |
| 4,022,947 | 5/1977 | Grubb et al. | 428/432 |
| 4,223,974 | 9/1980 | Masso | 359/360 |
| 4,327,967 | 5/1982 | Groth | 359/591 |
| 4,450,201 | 5/1984 | Brill et al. | 428/336 |
| 4,462,883 | 7/1984 | Hart | 204/192.26 |
| 4,769,291 | 9/1988 | Belkind et al. | 428/630 |
| 4,773,717 | 9/1988 | Pai et al. | 359/589 |
| 4,780,372 | 10/1988 | Tracy et al. | 428/428 |
| 4,799,745 | 1/1989 | Meyer et al. | 359/589 |
| 4,965,121 | 10/1990 | Young et al. | 428/213 |
| 5,047,131 | 9/1991 | Wolfe et al. | 204/192.23 |
| 5,066,615 | 11/1991 | Brady et al. | 437/229 |

(List continued on next page.)

FOREIGN PATENT DOCUMENTS

| | | | |
|---|---|---|---|
| 0303109 | 2/1989 | European Pat. Off. | C03C 17/36 |
| 0436741 | 7/1991 | European Pat. Off. | C23C 14/10 |
| 0456487 | 11/1991 | European Pat. Off. | G02B 5/28 |
| 0567735 | 3/1993 | European Pat. Off. | G02B 5/28 |
| 0560534 | 9/1993 | European Pat. Off. | G02B 5/28 |
| 2345760 | 7/1975 | Germany | G02B 5/28 |
| 2052787 | 1/1981 | United Kingdom | G02B 5/28 |
| 2135697 | 9/1984 | United Kingdom | C23C 15/00 |
| 92/01081 | 1/1992 | WIPO | C23C 14/34 |

OTHER PUBLICATIONS

Al–Jumaily, "Corrosion Mechanisms for Silver Exposed to the Atmosphere", J. Electrochem., 139:7 (Jul. 1992), pp. 1963–1970.

(List continued on next page.)

*Primary Examiner*—Paul M. Dzierzynski
*Assistant Examiner*—John Juba, Jr.
*Attorney, Agent, or Firm*—David A. Draegert; Salvatore P. Pace

[57] ABSTRACT

An infrared reflecting interference filter capable of transmitting a desired proportion of visible radiation while reflecting a large portion of incident solar radiation is provided. The filter comprises a transparent substrate onto which is deposited a dielectric layer, followed by metal and dielectric layers. In between each of the dielectric and metal layers is deposited a precoat layer that promotes adhesion between the dielectric and the metal. One aspect of the invention is the use of a film comprising nickel and chromium nitride for each of the metal precoat layers. These precoat layers are thin so that there is less absorption of visible light but yet maintains good adhesive properties. Another aspect of the invention is the use of silver as the metal layer. Specifically, silver is sputtered in an atmosphere containing a mixture of nitrogen and argon or other inert gas. It was found that the presence of nitrogen produces a silver layer that is more durable than silver films sputtered in an atmosphere containing essentially pure inert gas. In one embodiment, the interference filter comprises a glass substrate onto which is deposited a thin-film design consisting of five layers, namely: titanium dioxide, nickel-chromium nitride, silver, nickel-chromium nitride, and silicon nitride.

29 Claims, 4 Drawing Sheets

U.S. PATENT DOCUMENTS

| | | | |
|---|---|---|---|
| 5,069,968 | 12/1991 | Nietering | 428/336 |
| 5,073,451 | 12/1991 | Iida et al. | 359/359 |
| 5,085,926 | 2/1992 | Iida et al. | 359/359 |
| 5,091,244 | 2/1992 | Biornard | 359/586 |
| 5,110,637 | 5/1992 | Ando et al. | 428/34 |
| 5,133,850 | 7/1992 | Kukla et al. | 204/298.21 |
| 5,229,881 | 7/1993 | Day et al. | 359/360 |
| 5,279,722 | 1/1994 | Szczyrbowski et al. | 204/192.27 |
| 5,302,449 | 4/1994 | Eby et al. | 359/359 |
| 5,337,191 | 8/1994 | Austin | 359/359 |
| 5,344,718 | 9/1994 | Hartig et al. | 359/360 |
| 5,377,045 | 12/1994 | Wolfe et al. | 359/585 |

OTHER PUBLICATIONS

Patent Abstracts of Japan, vol. 13, No. 49 (C–565) 3 Feb. 1989 (Asahi Glass Co Ltd) abstract.

Chemical Abstracts, vol. 113, No. 20, 12 Nov. 1990, Columbus, OH, abstract No. 176986s, Egbert Feuerriegel et al. 'Formation F Titanium Nitride–Based Gold–Colored Decorative Patterns on Cramics and Glass' abstract.

"Structural Disorder Phenomena in Thin Metal Films" by C. A. Neugebauer, Physics of Thin Films, vol. 2 (Academic Press, 1964) pp. 1–62.

Bhattacharya et al., "Corrosion Behavior of Amorphous Ni Based Alloy Coatings Fabricated by Ion Beam Mixing," *J. Vac. Sci. Technol. A*, 3:6 (Nov./Dec. 1985), pp. 2680–2683.

Hoffman et al., "Effects of Substrate Orientation and Rotation on Internal Stresses in Sputtered Metal Films," *J. Vac. Sci. Technol.*, 15:2 (Mar./Apr. 1979) pp. 134–137.

Thornton et al., "Internal Stresses in Metallic Films Deposited by Cylindrical Magnetron Sputtering," *Thin Solid Films*, 64 (1979) pp. 111–119.

Bell et al., "The Effects of Initial Growth Conditions on the Stress Profiles of Mo Sputtered onto Both Moving and Stationary Substrates," *J. Vac. Sci. Technol. A*, 10:4 (Jul./Aug. 1992), pp. 1442–1445.

Belkind et al., "Reactive Co–Sputtering of Oxides and Nitrides Using a C–Mag™ Rotatable Cylindrical Cathode," *Surface and Coatings Technology*, 49, (1991) 155–160.

Al–Jumaily, "Effects of Ion Bombardement on the Environmental Durability of Silver Coatings," *Applied Optics*, 28:15 (Aug. 1989), pp. 3274–3275.

Graedel, "Corrosion Mechanisms for Silver Exposed to the Atmosphere," *J. Electrochem.*, 139:7 (Jul. 1992), pp. 1963–1970.

Jansen et al., "On the Chemical and Mechanical Properties of Sputtered Silicon Nitride Films," *Thin Solid Films*, 219 (1992), pp. 139–145.

Thornton et al., "Stress–Related Effects in Thin Films," *Thin Solid Films*, 171 (1989), pp. 5–31.

DURABLE LOW-EMISSIVITY SOLAR CONTROL THIN FILM COATING

This is a continuation of application Ser. No. 08/054,521, filed Apr. 28, 1993 now abandoned.

BACKGROUND OF THE INVENTION

This invention relates generally to visibly transparent infrared reflecting interference filters, and more particularly, to a durable low-emissivity filter.

The use of transparent panels in buildings, vehicles and other structures for controlling solar radiation is quite prevalent today. The goal of solar control is to transmit light while excluding much of the solar energy, thus decreasing the amount of air condition or cooling required, and conserving energy. In addition, modified glass as a structural material provides the color flexibility architects desire.

Various processes have been employed to alter the optical properties of these panels, including coating glass or plastic substrates by various techniques such as electrolysis, chemical vapor deposition and physical vapor deposition, including sputtering with planar magnetrons. For instance, thin metal films have been deposited on glass or plastic to increase the reflectance of solar radiation. Windows deposited with a multi-layer dielectric-metal-dielectric coating that exhibits high visible transmittance, and high reflectivity and low emissivity in the infrared range, are even more energy efficient. The index of refraction of the dielectric layer is preferably 2.0 or greater in order to minimize the visible reflectance and enhance the visible transmittance of the window. This dielectric layer which often consists of metal oxide coating also offers additional protection to the fragile metal films. The optical properties of panels can also be modified by altering the composition of the substrate material. Nevertheless, interference filter panels manufactured by the above-described methods have been only partially successful in reflecting solar radiation to the degree required for significant energy conservation. For example, Apfel et al., U.S. Pat. No. 3,682,528, issued Aug. 8, 1972, described an infra-red interference filter with visible light transmission of only approximately 72% and with infra-red transmission of approximately 8%.

Another problem associated with interference filters is their structural integrity, particularly their inability to withstand harsh environmental conditions. Current transparent panels having high reflectivity for solar radiation are unsatisfactory in that the panels are subject to chemical and mechanical degradation.

SUMMARY OF THE INVENTION

It is a primary object of the present invention to provide a durable, thin-film interference filter which transmits visible light while reflecting infrared radiation.

It is another object of the present invention to provide a low emissivity interference filter with an emissivity of about 0.1 and better than 82% transmission in the visible region.

These and additional objects are accomplished by the present invention which provides a durable, thin-film interference filter which comprises a transparent substrate onto which is deposited a first dielectric layer, followed by metal and second dielectric layers. In between each of the dielectric and metal layers is deposited a precoat layer that promotes adhesion between the dielectric and the metal.

One aspect of the invention is the use of a nickel and chromium nitride for each of the metal pre-coat layers. The Ni—$CrN_x$ films are thin so that there is less absorption of visible light, but yet maintains good adhesive properties. Another aspect of the invention is the use of silver as the metal layer. Specifically, silver is sputtered in an atmosphere containing a mixture of nitrogen and argon or other inert gas. It was found that the presence of nitrogen produces a silver layer that is more durable than silver films sputtered in an atmosphere containing essentially pure argon.

In one preferred embodiment, the interference filter comprises a glass substrate onto which is deposited a thin-film design consisting of five layers, namely: titanium dioxide, nickel-chromium nitride, silver, nickel-chromium nitride, and silicon nitride.

Another preferred embodiment of the interference filter comprises of a five layer structure wherein one or both of the dielectric layers is formed of a composite material containing zirconium nitride and silicon nitride. It was found that mixing zirconium nitride with silicon nitride creates a composite layer that has a high refractive index and excellent transparency in the visible region. Moreover, the optical properties of this composite layer can be adjusted by varying the relative amounts of zirconium nitride and silicon nitride.

The dielectric layers of the inventive interferences filters can be reactively sputtered by a rotatable cylindrical magnetron. Composite layers can be formed by cosputtering from dual cathode targets or from one or more alloy targets. A feature of the inventive process is that by reducing the intrinsic stress of the second dielectric layer, an extremely hard and chemically resistant thin film coating is produced. In sputtering silicon nitride as the second dielectric layer, it was demonstrated that the intrinsic stress of this layer can be reduced by orienting the magnetic assembly of the cathode at an acute angle vis-a-vis the substrate.

DESCRIPTION OF THE PREFERRED EMBODIMENTS

Figure 1:
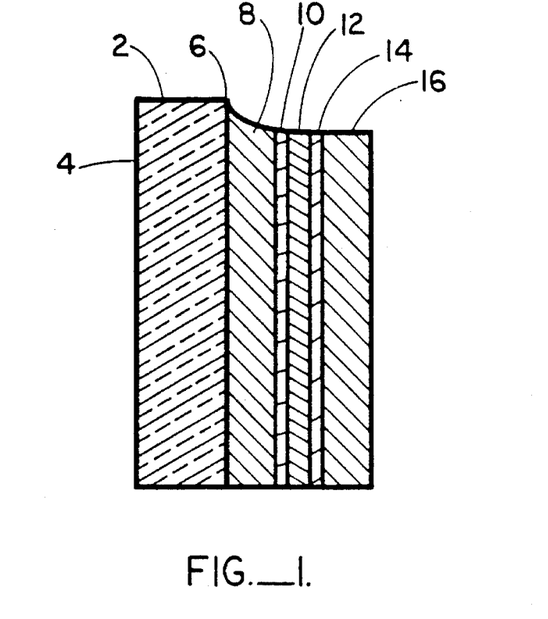
FIG. 1 is a cross-sectional view of a five layer design thin-film interference filter produced in accordance with this invention.

A thin-film interference filter incorporating the present invention is shown in FIG. 1. The filter comprises of a transparent substrate 2 which is provided with two planar parallel surfaces 4 and 6, in which surface 4 is exposed to the medium and surface 6 is coated. The substrate can be formed of any suitable transparent material; however, the substrate is preferably a material which has superior structural properties and minimum absorption in the visible and near-infrared spectra regions where the solar energy is concentrated. Crystalline quartz, fused silica, soda-lime silicate glass, and plastics such as polycarbonates and acrylates, are all preferred substrate materials.

Deposited onto the substrate surface 6 is a first dielectric layer 8 that is preferably made of a material having an index of refraction of greater than about 1.5, and more preferably between 2.1 and 2.5 or higher. Suitable dielectric layer materials include metal oxides such as titanium dioxide, niobium pentaoxide ($Nb_2O_5$), tin oxide, zinc oxide, indium oxide (optionally doped with tin oxide), bismuth oxide, and zirconium oxide. See Hart, U.S. Pat. No. 4,462,883, issued Jul. 31, 1984, which is incorporated herein by reference. Yet another suitable material is silicon nitride. Another suitable dielectric material comprises a thin composite film containing zirconium nitride and silicon nitride (collectively referred to herein as "SiZrN") that is fabricated by cosputtering from dual targets or from a single alloy target of a dc cylindrical magnetron.

Besides SiZrN, composite films comprising titanium nitride and silicon nitride (collectively referred to herein as "SiTiN") or comprising hafnium nitride and silicon nitride (collectively referred to herein as "SiHfN") can also be used. SiTiN and SiHfN composite films are also prepared by cosputtering from dual or single targets. Finally, a composite film comprising a mixture of silicon nitride, aluminum nitride, zirconium nitride, titanium nitride, and/or hafnium nitride can be used as the first dielectric layer. The refractive index of the composite films will vary depending on the relative amounts of the different nitrides that comprise each film. It has been found that when silicon nitride is used as the first dielectric layer, the visible light transmission of the inventive filter is slightly less than the transmission when titanium dioxide or a composite film is used, particularly if the silver metal layer is equal to or greater than approximately 100 Å in thickness.

One method of depositing composite films is cosputtering of a cylindrical magnetron employing dual targets with one target being made of silicon and the other target being made of either zirconium, titanium, hafnium, or mixtures thereof. When cosputtering with dual cathodes with nitrogen as the reactant gas, the angle of the magnetic assembly of each target can be adjusted to get homogeneous composition distribution. A description of a method for cosputtering composite films from a magnetron device having dual cathode targets is found in copending application Ser. No. 07/846,224, filed Mar. 4, 1992, now abandoned, by inventors Wolfe et al, of common assignee, which is incorporated herein by reference.

Generally, the thickness of the first dielectric layer ranges from approximately 250 to 450 Å, and more preferably from approximately 280 to 330 Å. When $TiO_2$ is used as the first dielectric layer, the thickness of the layer preferably ranges from approximately 200 to 400 Å, and more preferably from approximately 250 to 330 Å.

As shown in FIG. 1, the inventive filter next comprises a first metal precoat 10 that is deposited over the first dielectric layer. Precoat layer 10 is preferably maintained as thin as possible so that it will have very little, if any, adverse effect upon the optical characteristics of the filter or the subsequent metal layer. Precoat layers with thicknesses ranging from approximately 5 to 20 Å have been satisfactory. Preferably, the first metal precoat layer comprises a mixture of nickel metal and chromium nitride (designated as Ni—$CrN_x$ or nickel/chromium nitride) with a thickness between approximately 8 to 15 Å. Alternatively, the precoat can comprise of nickel-chromium alloy preferably comprising approximately 20% to 90% nickel and approximately 10% to 40% chromium; and more preferably the alloy content is approximately 80% nickel and 20% chromium. The alloy may contain small amounts (up to approximately 15%) of other metals as well. An alloy containing approximately 5%–15% molybdenum is believed to further increase the chemical durability of the precoat layer. Nichrome (or NiCr) shall refer to alloys having various ratios of nickel, chromium, molybdenum, and other metals that can be used as the precoat layer.

Next, a partially reflective metal layer 12 is deposited onto the first precoat layer. The metal layer reflects infrared-radiation, yet allows for sufficient visible light transmission. The metal layer can be formed from a number of materials, with silver being particularly satisfactory. Other metals that can be utilized include gold, copper, and platinum. The thickness of the metal layer ranges from approximately 80 to 150 Å, and more preferably, from approximately 100 to 125 Å. When the metal layer comprises silver, the thickness should be from approximately 80 to 150 Å, and more preferably from approximately 90 to 125 Å.

A second metal precoat layer 14 is then deposited onto the metal layer which is followed by the final dielectric layer 16. This second metal precoat layer can also comprise a nickel-chromium alloy (as described above for the first precoat layer) but more preferably comprises a film of Ni—$CrN_x$. The second precoat layer has the same thickness ranges as that of the first precoat layer.

The second dielectric layer preferably comprises silicon nitride formed by reactively sputtering a cylindrical magnetron. This layer has a thickness from approximately 200 to 500 Å, and more preferably from approximately 400 to 450 Å. The above described composite films can also be used although the relative proportion of silicon nitride in each film should be adjusted so that the refractive index ranges preferably from approximately 1.98 to 2.08 (550 nm). When a composite film is used, its thickness should be from approximately 300 to 500 Å, preferably 400 to 450 Å. However, whether silicon nitride or a composite substance is used as the second dielectric layer, the layer most preferably should exhibit low intrinsic stress. It was found that by reducing the intrinsic stress of the second dielectric layer, an extremely hard and chemically resistant thin film coating is produced. To provide additional protection to the inventive filter, a plastic laminate can be applied to the filter of FIG. 1. See Young et al., U.S. Pat. No. 4,965,121, issued Oct. 23, 1990 incorporated herein by reference.

The precoat, metal, and dielectric layers were deposited with a d.c. magnetron. The dielectric layers were prepared by dc-reactive sputtering with a rotating cylindrical magnetron. A description of a cylindrical magnetron suitable for depositing substrates with the dielectric materials is found in Wolfe et al., U.S. Pat. No. 5,047,131, issued Sep. 10, 1991, incorporated herein by reference.

A cylindrical or planar magnetron wherein the target material is nichrome can be employed to reactively sputter the Ni—$CrN_x$ film in an atmosphere comprising of nitrogen and an inert gas such as argon. At typical dc-sputtering temperatures, nickel does not form nitrides. (Without the nitrogen gas, a film comprising of nickel and chromium would be deposited instead.) Alternatively, the Ni—$CrN_x$ film can be deposited by using a magnetron with dual cathodes wherein one of the cathodes has a nickel target and the other has a chromium target to reactively sputter the Ni—$CrN_x$ film.

With respect to the metal layer, it was also found that sputtering a silver metal layer in an atmosphere containing some nitrogen produced interference filters having improved environmental and optical properties vis-à-vis filters in which the silver was sputtered in an atmosphere containing no nitrogen or in an atmosphere containing essentially pure nitrogen.

Figure 2:
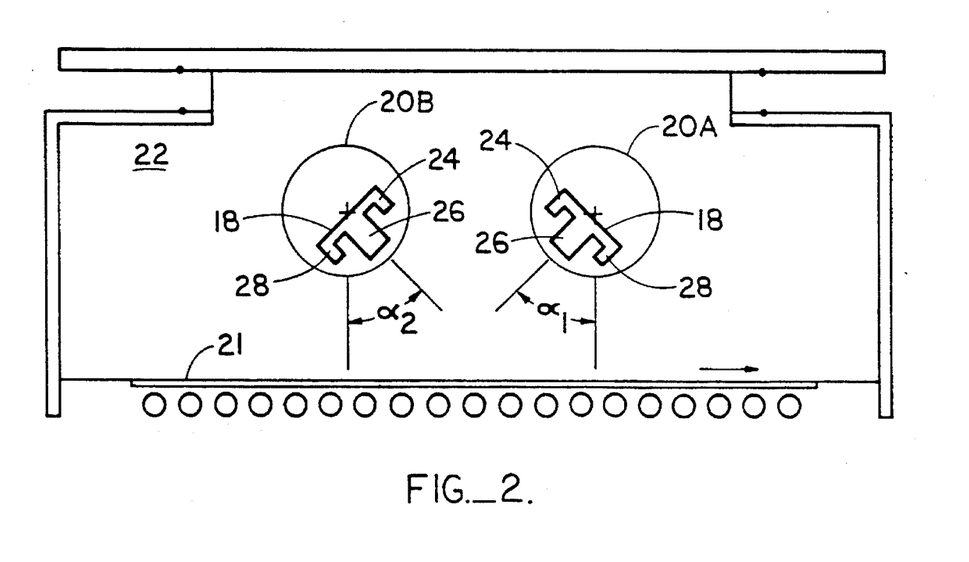
FIG. 2 is a cross-sectional view of a magnetron device.

In depositing silicon nitride as the second dielectric layer with dual rotatable cylindrical magnetrons, it was found that the intrinsic stress of the silicon nitride layer can be reduced by orienting the magnetic assembly of each cathode at an acute angle. As shown in FIG. 2, which is a cross-sectional schematic view of a magnetron having dual cathodes 20A and 20B positioned in vacuum chamber 22. Each magnetic assembly 18 has a "W" configuration with three elongated magnetics 24, 26, and 28. The permanent magnetics formed an unbalanced system which is typical for rotatable cylindrical magnetrons. The magnetic assembly of cathode 20A is oriented at an acute angle $\alpha_1$ of approximately 45° so as to direct sputtered material towards the substrate 21 as it enters the deposition chamber. Similarly, the magnetic assembly of cathode 20B is oriented at an angle $\alpha_2$ of approximately 45°. Each of angle $\alpha_1$ or $\alpha_2$ can range from approximately 20° to 60° independently, more preferably about 30° to 50° and most preferably about 45°. Each cathode is approximately 2.5 inches (6.35 cm) from the substrate and the center of cathode 20A is approximately 8.5 inches (21.59 cm) from the center of cathode 20B. Silicon nitride layers so deposited have approximately one-fourth the intrinsic stress of silicon nitride layers produced when the assembly is at a normal angle relative to the substrate. It is not necessary that dual cylindrical cathodes be employed to reactively sputter $Si_3N_4$ but, if a single cathode is used, it is preferred that cathode 20A be employed with the substrate moving towards it.

The device as shown in FIG. 2 can also be used to reactively cosputter composite films such as SiZrN. For instance, one cathode could have a silicon target and the other cathode could have a zirconium target.

Experimental Results

A low-emissivity interference filter having the structure as shown in FIG. 1 comprising a glass substrate, a titanium dioxide first dielectric layer, nickel/chromium nitride precoat layers, a silver metal layer, and a silicon nitride second dielectric layer was fabricated in an in-line magnetron system. The system comprises of five sources of sputtering arranged in series, with each sputtering source depositing one of the five layers of the filter. The second, third, and fourth sputtering sources comprised a planar magnetron housed in a vacuum chamber for depositing the first precoat, metal, and second precoat layers respectively. The planar magnetrons, each comprising of a model HRC-3000 unit, were manufactured by Airco Coating Technology, a division of assignee. The first and fifth sputtering source each comprised a cylindrical magnetron having dual targets to deposit the dielectric layers. Each cylindrical magnetron comprised dual C-Mag™ model 3000 cathodes, also manufactured by Airco.

The targets of each cylindrical magnetron were conditioned using an inert gas, thereafter the process gas was added until the desired partial pressure was reached. The process was operated at that point until the process was stabilized. The substrate was then introduced to the coat zone of the first cylindrical magnetron and the film was applied. The substrate used was soda lime glass.

For depositing a first dielectric layer comprising of titanium dioxide, the magnetron employed a pair of titanium targets. It is known that $TiO_2$ is the predominant form of titanium oxide created in the sputtering process. However, it is believed that other forms are produced as well. Thus, unless otherwise stated, $TiO_2$ will represent all forms of titanium oxide produced. $TiO_2$ is particularly suited as the first dielectric layer since its index of refraction is 2.50 (550 nm). Using $TiO_2$ results in an interference filter with a transmission of approximately 2% better than if silicon nitride had been used. Argon was the inert gas and oxygen was the reactant gas.

When reactively sputtering silicon nitride as the second dielectric layer in the cylindrical magnetron as shown in FIG. 2, argon was used as an inert gas and nitrogen was used as the reactant gas. Other inert gases can be used. (All forms of silicon nitride will be represented by $Si_3N_4$.) The partial pressure of the gas was determined by the transition from the nitride mode to the metallic mode. Experiments were run as close to that transition as practicable. The pressure and flow rate of the sputtering gases were controlled by conventional devices. Because the electrical conductivity of pure silicon is so low that it is unsuitable for sputtering with direct current, each silicon target was impregnated or doped with a small amount of aluminum. The magnet assembly of each cathode was oriented at an angle of approximately 45° from normal. With nitrogen as the sputtering gas, the coating contained a mixture of aluminum and silicon nitrides. All of these components are relatively hard and form an amorphous film that acts as a strong barrier. However, the amount of aluminum in the film did not interfere with formation of the desired silicon based compound films. The stoichiometry of the silicon nitride formed has been found to be close to the theoretical 3:4 ratio for $Si_3N_4$.

For depositing each of the Ni—$CrN_x$ film precoat layers, a planar magnetron employing a nichrome target was used. The nichrome used comprised approximately 80% nickel and 20% chromium. The gas mixture comprise approximately 60% nitrogen and 40% argon. Nickel sputtered from the nichrome target did not nitride, but the chromium sputtered apparently did. The film so produced is amorphous, chemically resistant, electrically conductive, and extremely hard and durable. It was found that with respect to the inventive thin film interference filters, when Ni—$CrN_x$ is used, the precoat layer(s) can be approximately 40% thinner than NiCr, and yet the filters will still maintain the same durability. In addition, by reducing the thickness of the first and/or second metal precoat layers, the overall transmission of the interference filter for visible light increases. However, for interference filters that may be subject to harsh environments, each Ni—$CrN_x$ precoat layer should have a thickness of at least about 8 Å since it was found that interference filters with thinner precoat layers often failed the salt fog test and/or the humidity tests. In order to avoid sputtering excessively thick metal precoat layers, shields or baffles should be employed in the vacuum chamber of the magnetron device to intercept some of the sputtered material and to control the rate of deposition onto the substrate.

For depositing the silver metal layer, a planar magnetron with a silver target was used. The sputtering occurred in an atmosphere containing 60% nitrogen and 40% argon.

Table 1 sets forth typical process data for deposition of an inventive filter with the in-line magnetron system. It is recommended that the $H_2O$ has a partial pressure of less than or equal to $10^{-7}$ Torr in the system. This can be accomplished by conventional means including the use of meisner-coils to condense the water, or high vacuum pumps. Other measures include backfilling the system in nitrogen for 8 to 20 hours before reactive sputtering at a pressure of approximately $1\mu$.

TABLE 1

| Layer | Thickness (Å) | Flow-rate (SCCM) Ar | Flow-rate (SCCM) N₂ | Flow-rate (SCCM) O₂ | Flow-rate (SCCM) He | Potential (V) | Power (kW) | Pressure (μ) | No. Passes |
|---|---|---|---|---|---|---|---|---|---|
| TiO₂ | 278 | 10 | 0 | 102 | 0 | −402 | 17 | 2.0 | 8 |
| Ni—CrN$_x$ | 8 | 95 | 143 | 0 | 0 | −452 | 6.5 | 2.5 | 1 |
| Ag | 121 | 95 | 143 | 0 | 0 | −475 | 9.0 | 2.5 | 1 |
| Ni—CrN$_x$ | 8 | 95 | 143 | 0 | 0 | −452 | 6.5 | 2.5 | 1 |
| Si₃N₄ | 436 | 41 | 270 | 0 | 12 | −451 | 11 | 4.0 | 4 |

The addition of helium in the sputtering process created additional atomic nitrogen through peening ionization. It was found that the addition of helium also decreased the amount of arcing at the cathode targets which apparently resulted in improved uniformity of the deposited film.

A comparison of the inventive filter to prior art filters with respect to optical properties and mechanical and chemical durability was made. The representative inventive interference filter tested consisted of a five layer film coated on a 3 mm soda lime glass as illustrated in FIG. 1. The five layers had thickness as set forth in Table 1. For convenience, the structure is designated as Glass/TiO₂/Ni—CrN$_x$/Ag/Ni—CrN$_x$/Si₃N₄ and will be referred to as the "Inventive Filter" hereinafter. Similarly, the structures of the three prior art filters are:

Comparative Filter I: Glass/Si₃N₄/NiCr/Ag/NiCr/Si₃N₄ (Layer Thicknesses) 3 mm/325 Å/14 Å/80 Å/450 Å

Comparative Filter II: Glass/ZnO₂/Ag/Ti/ZnO₂/TiO₂ (Layer Thicknesses) 3 mm/375 Å/85 Å/20 Å/175 Å/125 Å

Comparative Filter III: Glass/SnO₂/Ag/Zn/SnO₂/TiO₂ (Layer Thicknesses) 3 mm/375 Å/85 Å/20 Å/175 Å/125 Å

The procedures of the tests are described and the results are tabulated as follows.

TABLE 2

Optical Characteristics

| Property | Inventive Filter | Comparative Filter I | Comparative Filter II |
|---|---|---|---|
| % T$_{vis}$ in air | 82 | 76 | 83 |
| % T$_{solar}$ in air | 63 | 62 | 66 |
| % R$_g$ in air | 6 | 8 | 10 |
| % R$_g$ solar in air | 16 | 12.5 | 17 |
| 'a' | −2.0 | −2.5 | −3.0 |
| 'b' | 0.0 | −7.5 | −9.0 |
| % R$_f$ in air | 4.5 | 4 | 7 |
| % R$_f$ solar in air | 19 | 14 | 18 |
| 'a' | −1.5 | −1.0 | −3.0 |
| 'b' | 0.0 | −6.0 | −11.0 |
| Emissivity | 0.10 | 0.16 | 0.10 |

(All optical data for CIE Illuminant "C" at 10° STD observed.)

TABLE 3

Summary of Durability Test -- Results

| Test Results | Comparative Filter I | Comparative Filter II | Comparative Filter III | Inventive Filter |
|---|---|---|---|---|
| Humidity | 9.9 | 7.6 | 7.0 | 9.9 |
| Salt Fog | 9.2 | 1.2 | 1.3 | 8.7 |
| UV | 9.7 | 9.4 | 9.4 | 9.8 |
| Salt Dot | 9.6 | 1.2 | 1.4 | 9.8 |
| NH₄OH | 9.6 | 1.2 | 1.3 | 9.6 |
| NaOH | 10.0 | 9.8 | 10.0 | 9.1 |
| HCl | 9.6 | 1.2 | 1.3 | 8.6 |
| H₂SO₄ | 10.0 | 1.2 | 1.8 | 9.9 |
| Taber | 9.5 | 1.7 | 0.3 | 8.2 |

Figure 3:
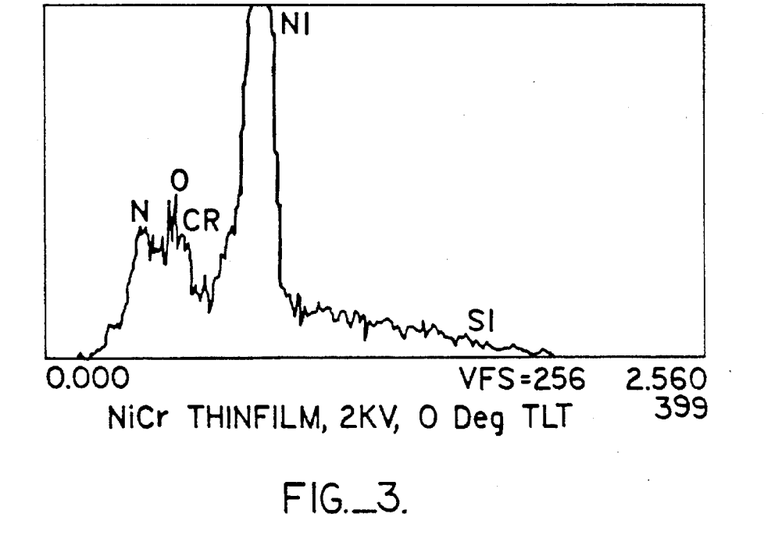
FIG. 3 is an EDS spectrum for a Ni—$CrN_x$ film.
Figure 4:
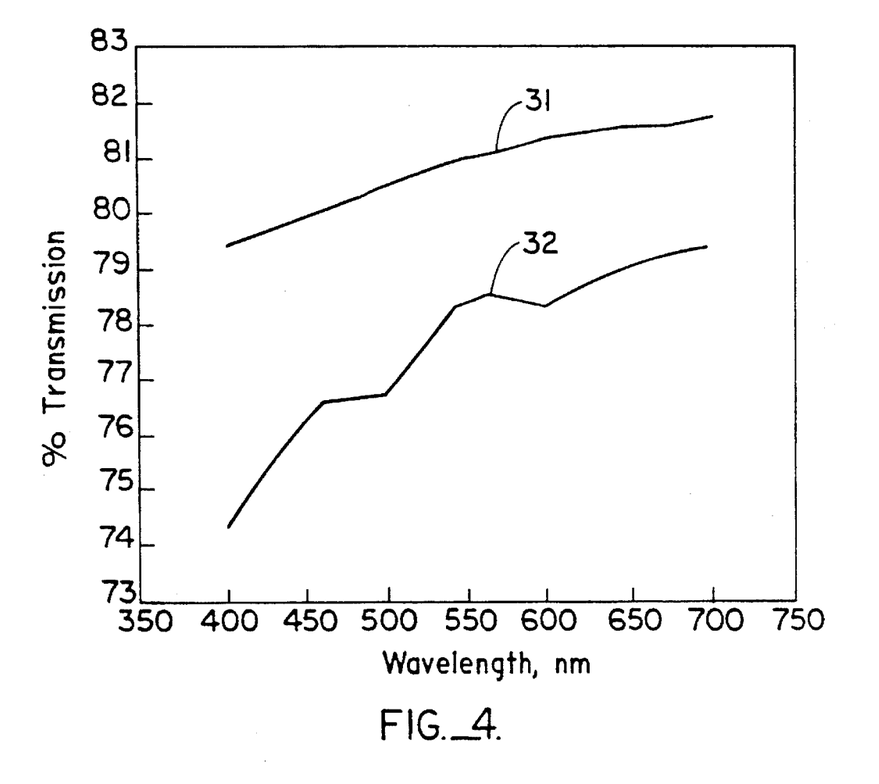
FIG. 4 is a graph of percentage transmission versus wavelength for Ni—$CrN_x$ films.

The stoichiometry of the Ni—CrN$_x$ films deposited from the nichrome target was analyzed by EDS (electron dispersive spectroscopy), the results of which are set forth in FIG. 3. The spectrum shows that approximately the same amount of chromium and nitrogen is incorporated into the Ni—CrN$_x$ film. The advantage of using Ni—CrN$_x$ film, as opposed to essentially a nichrome film, for either one or both of the metal precoat layers is shown in FIG. 4, which is a graph of the transmission versus the wavelength of light for different thin film interference filters. Curve 31 is the transmission of the tested representative inventive interference filter as described above except that the first and second metal precoat layers are each approximately 16 Å thick. In comparison, curve 32 is for an inventive interference filter having the same composition except that the precoat layers each comprises nichrome of approximately 32 Å in thickness. As is apparent, the filter with the Ni—CrN$_x$ as represented by curve 31 exhibits higher transmissions in the visible region.

Figure 5:
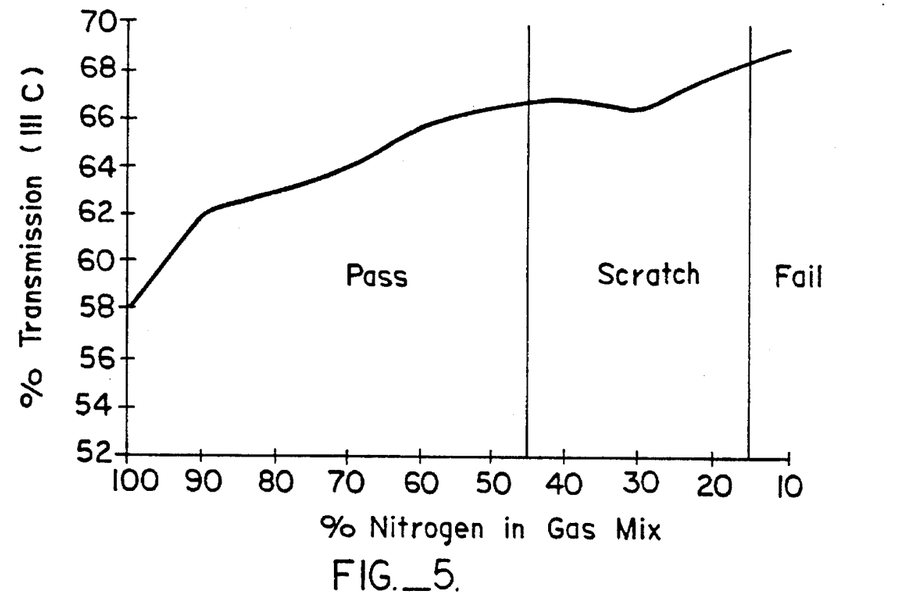
FIG. 5 is a graph of percentage transmission of silver films versus nitrogen concentration in the atmosphere in which silver metal was sputtered.

It was found that inventive interference filters wherein the silver metal layer is sputtered in an atmosphere containing nitrogen provided improved optical characteristics and mechanical durability. FIG. 5 is a graph of transmission (Ill-C) versus wavelength for silver films, each 100 Å thick, that were sputtered in atmospheres containing different percentages of nitrogen and argon. The pressure was 4 mTorr. Each film had an emissivity of 0.10 and a sheet resistance of 10 Ohms/sq. As is apparent, the percentage transmission increases as the percentage of nitrogen in the atmosphere decreases. In addition, the mechanical durability of each film was tested by conventional mil-spec tests with each film subjected to 50 cheesecloth rubs. As shown in FIG. 5, silver films sputtered in atmospheres containing approximately 45% to 100% nitrogen passed the test, whereas silver films sputtered in atmospheres containing lees than about 15% nitrogen failed. Silver films sputtered in an atmosphere containing approximately 15% to 45% nitrogen showed intermediate results. Thus, in order to achieve an acceptable transmission percentage and to maintain mechanical durability, the amount of nitrogen should be approximately 45% to 60%.

Figure 6:
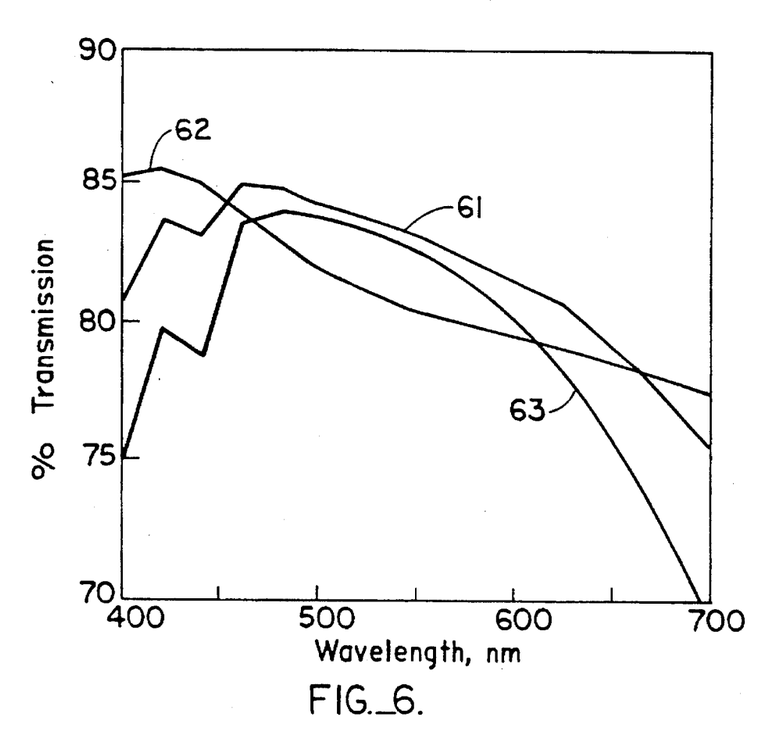
FIG. 6 is a graph of percentage transmission versus wavelength for interference filters having different silver metal thicknesses.
Figure 7:
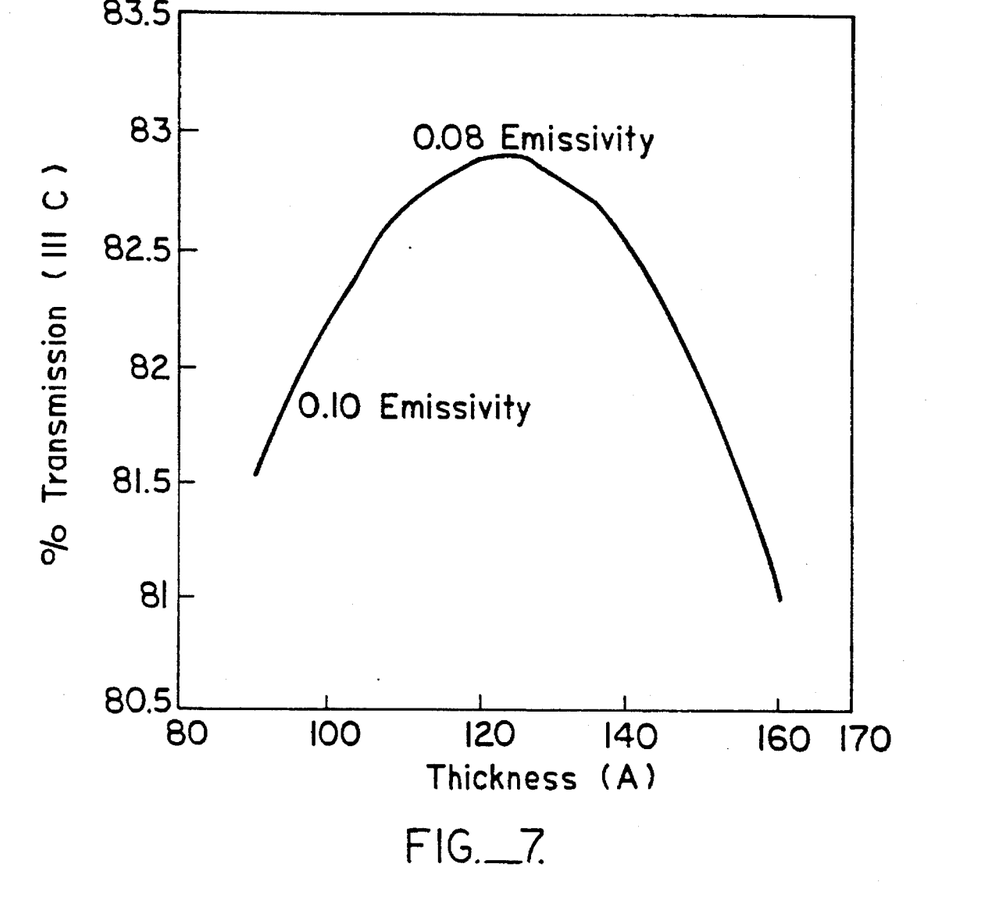
FIG. 7 is a graph of percentage transmission versus silver metal thickness and emissivity.

The thickness of the metal layer also is important since one goal of an interference filter is to maintain a low emissivity level, preferably 0.10 or less. FIG. 6 is a graph of transmission versus wavelength for the representative inventive filter having different amounts of silver metal. As is apparent, within the visible region, the filter with a silver metal layer of 120 Å (curve 61) had better overall transmission relative to one having a silver metal layer of 80 Å (curve 62) or 140 Å (curve 63). Similarly, FIG. 7 is a graph of transmission versus silver thickness and emissivity for the silver metal layer of the representative inventive filter. The phenomenon of increasing the transmission of a metal layer is known as induced transmission. Berning et al., *J. Opt. Soc. Am.*, 47, 1957, p. 230.

TABLE 4

Durability Test Scores: Humidity, Salt Fog, and UV Exposure Tests

Test Scoring Definitions

| | |
|---|---|
| Change in % $R_f$, etc. | the average change for the test |
| Emiss Score | an average of emissivity scores |
| # Defects | the average number of defects counted on the micrograph at 200x |
| Defect Area | an average of the total area of the defects on the micrographs, $mm^2 \times 10^{-4}$ |

| | Comp. Filter I | Comp. Filter II | Comp. Filter III | Comp. Filter II (N)* | Invent. Filter |
|---|---|---|---|---|---|
| No. of samples tested | 5 | 10 | 2 | 2 | 3 | 18 |
| Humidity (96 Hrs) | | | | | | |
| Change in % $R_f$ | 0.07 | 0.18 | 0.30 | 1.55 | 0.88 | 0.63 |
| Change in $R_f$ a | 0.08 | 0.16 | 0.63 | −0.40 | 0.04 | −0.70 |
| Change in $R_f$ b | −0.22 | 0.13 | −0.53 | 0.81 | 0.21 | −0.26 |
| Emiss Score | 9.9 | 9.7 | 7.6 | 7.0 | 8.8 | 9.9 |
| # Defects | 21 | 62 | 180 | 304 | 407 | NA |
| Defect Area | 8.26 | 40.42 | 505.54 | 92.00 | 92.37 | 0.85 |
| Salt Fog (72 Hrs) | | | | | | |
| Change in % $R_f$ | 0 | 0.22 | Film | Film | Film | 0.37 |
| Change in $R_f$ a | 0.005 | 0.12 | Gone | Gone | Gone | −0.15 |
| Change in $R_f$ b | −0.19 | −0.09 | | | | 0.84 |
| Emiss Score | 9.2 | 9.2 | 1.2 | 1.3 | 1.2 | 8.7 |
| # Defects | 88 | 32 | Film | Film | Film | NA |
| Defect Area | 12.27 | 56.17 | Gone | Gone | Gone | 1.94 |
| UV (120 Hrs) | | | | | | |
| Change in % $R_f$ | −0.10 | −0.02 | −0.02 | −0.26 | −0.02 | 0.65 |
| Change in $R_f$ a | 0.28 | 0.10 | 0.23 | 0.39 | −0.13 | −0.01 |
| Change in $R_f$ b | −0.98 | 0.11 | 0.47 | 1.05 | 0.47 | 0.28 |
| Emiss Score | 9.7 | 10.0 | 9.4 | 9.4 | 8.5 | 9.8 |
| # Defects | 7 | 20 | 9 | 145 | 458 | NA |
| Defect Area | 0.84 | 1.73 | 19.18 | 14.32 | 23.84 | 0.06 |
| Salt Dog Test (24 Hrs) | | | | | | |
| Emiss Score | 9.6 | 10.0 | 1.2 | 1.4 | 7.9 | 9.8 |
| # Defects | 9 | 15 | Film | Film | 249 | NA |
| Defect Area | 1.24 | 3.31 | Gone | Gone | 52.88 | 1.16 |

Comparative Filter II (N)* is Comparative Filter II that has been optimized for neutrality in reflected color.

TABLE 5

Durability Test Scores: Base Soak Test

Test Scoring Definitions

| | |
|---|---|
| Change in % T, etc. | the average change for the test |
| Emiss Score | an average of emissivity scores |
| # Defects | the average number of defects counted on the micrograph at 200x |
| Defect Area | an average of the total area of the defects on the micrographs, $mm^2 \times 10^{-4}$ |

TABLE 5-continued

|  | Comp. Filter I | Comp. Filter II | Comp. Filter III | Comp. Filter II (N)* | Invent. Filter |
|---|---|---|---|---|---|
| No. of samples tested | 5 | 10 | 2 | 2 | 3 | 18 |
| $NH_4OH$ Test (5 Hrs) | | | | | | |
| Change in % T | 0.11 | 0.08 | −0.87 | −0.11 | 1.37 | −0.15 |
| Change in % $R_f$ | 0.06 | −0.02 | 0.73 | −0.10 | 1.13 | 0.28 |
| Change in $R_f$ a | 0.16 | 0.05 | 2.14 | 0.69 | 0.80 | 0.06 |
| Change in $R_f$ b | −0.05 | 0.62 | 1.63 | 0.74 | −2.65 | 0.53 |
| Change in % $R_g$ | 0.13 | −0.18 | 0.16 | −0.59 | 1.51 | −0.61 |
| Change in $R_g$ a | 0.05 | 0.04 | 2.00 | 0.66 | 1.06 | −0.13 |
| Change in $R_g$ b | 0.29 | 0.54 | 1.82 | 0.45 | 0.46 | −0.10 |
| Emiss Score | 9.6 | 9.7 | 1.2 | 1.3 | 1.1 | 9.6 |
| # Defects | 27 | 52 | 207 | 56 | 156 | NA |
| Defect Area | 4.71 | 8.52 | 436.33 | 39.07 | 298.54 | 0.82 |
| NaOH Test (5 Hrs) | | | | | | |
| Change in % T | −0.05 | 0.01 | 0.14 | 0.16 | −0.08 | −0.14 |
| Change in % $R_f$ | −0.03 | −0.02 | 0.03 | −0.03 | 0.08 | −0.47 |
| Change in $R_f$ a | 0.15 | 0.33 | 0.01 | −0.01 | 0.01 | −0.05 |
| Change in $R_f$ b | 0.25 | 0.55 | 0.04 | −0.01 | −0.58 | −0.13 |
| Change in % $R_g$ | −0.14 | −0.20 | −0.03 | −0.04 | 0.15 | −0.47 |
| Change in $R_g$ a | 0.13 | 0.26 | 0.04 | −0.02 | 0.01 | −0.02 |
| Change in $R_g$ b | −0.07 | 0.27 | 0.08 | −0.03 | −0.31 | −0.22 |
| Emiss Score | 10.0 | 10.0 | 9.8 | 10.0 | 9.6 | 9.1 |
| # Defects | 43 | 64 | 95 | 161 | 634 | NA |
| Defect Area | 2.31 | 21.34 | 7.08 | 16.93 | 40.85 | 0.52 |

TABLE 6

Durability Test Scores: Acid Soak Test

Test Scoring Definitions

| | |
|---|---|
| Change in % T | the average change for the test |
| Emiss Score | an average of emissivity scores |
| # Defects | the average number of defects counted on the micrograph at 200x |
| Defect Area | an average of the total area of the defects on the micrographs, $mm^2 \times 10^{-4}$ |

|  | Comp Filter I | Comp. Filter II | Comp. Filter III | Comp. Filter II (N)* | Invent. Filter |
|---|---|---|---|---|---|
| No. of samples tested | 5 | 10 | 2 | 2 | 3 | 18 |
| HCl Test (5 Hrs) | | | | | | |
| Change in % T | 0.10 | 0.07 | 6.64 | −1.49 | 5.03 | 0.11 |
| Change in % $R_f$ | 0.07 | −0.01 | 1.57 | 8.00 | 1.94 | −0.25 |
| Change in $R_f$ a | −0.02 | 0.15 | 2.47 | 1.40 | 0.78 | −0.03 |
| Change in $R_f$ b | 0.14 | 0.49 | 8.01 | 0.90 | 0.66 | −0.18 |
| Change in % $R_g$ | −0.02 | −0.03 | −0.11 | 7.51 | 2.36 | −0.47 |
| Change in $R_g$ a | 0.02 | 0.14 | 2.79 | 1.29 | 1.00 | −0.04 |
| Change in $R_g$ b | 0.03 | 0.42 | 8.88 | 5.04 | 4.41 | −0.26 |
| Emiss Score | 9.6 | 9.9 | 1.2 | 1.3 | 1.1 | 8.6 |
| # Defects | 66 | 41 | Film | Film | Film | NA |
| Defect Area | 5.85 | 4.92 | Gone | Gone | Gone | 1.12 |
| $H_2SO_4$ Test (5 Hrs) | | | | | | |
| Change in % T | 0.06 | 0.02 | 6.60 | 0.77 | 1.77 | 0.16 |
| Change in % $R_f$ | −0.07 | 0.05 | 1.57 | 4.41 | 3.32 | −0.49 |
| Change in $R_f$ a | 0.21 | 0.03 | 2.49 | 1.08 | 1.85 | 0.01 |
| Change in $R_f$ b | −1.25 | 0.17 | 7.98 | 2.19 | 2.71 | −0.34 |
| Change in % $R_g$ | 0.33 | −0.01 | 0.02 | 5.65 | 3.93 | −0.47 |
| Change in $R_g$ a | 0.03 | 0.01 | 2.76 | 0.44 | 2.05 | −0.06 |
| Change in $R_g$ b | 0.17 | 0.52 | 8.93 | 4.57 | 6.57 | −0.20 |
| Emiss Score | 10.0 | 10.0 | 1.2 | 1.8 | 1.4 | 9.9 |
| # Defects | 85 | 40 | Film | 65 | Film | NA |
| Defect Area | 5.45 | 5.26 | Gone | 616.88 | Gone | 0.23 |

TABLE 7

Durability Tests Scores: Taber Test

| | | Taber Test, 50 Revs. | | |
|---|---|---|---|---|
| | | Scratch Score | Λ%T | Λ% Haze |
| Inventive Filter | | | | |
| | Average | 8.2 | −0.08 | 0.33 |
| | SD | 0.66 | 0.66 | 0.38 |
| Comparative Filter I | | | | |
| Sample 1 | Average | 9.5 | 1.5 | 0.35 |
| | SD[1] | .2 | 1.2 | .21 |
| Sample 2 | Average | 9.4 | 0.4 | 0.26 |
| | SD | .2 | .3 | .13 |
| Comparative Filter II | | | | |
| | Average | 1.7 | 2.2 | 0.97 |
| | SD | 1.3 | 2.0 | .13 |
| Comparative Filter III | | | | |
| | Average | 0.3 | 4.6 | 1.34 |
| | SD | .3 | 1.0 | .33 |
| Comparative Filter II (N) | | | | |
| | Average | 1.6 | 4.5 | 1.55 |
| | SD | .9 | 2.8 | .19 |

[1]SD = Standard Deviation

TABLE 8

Test Conditions and Scoring Procedures

| | | |
|---|---|---|
| A. | Humidity Test | 96 Hours exposure in a humidity cabinet at 60° C. with 95% RH |
| B. | Salt Fog Test | 72 hours in a 20% Salt Fog, at 95–98° F. |
| C. | UV Exposure Test | 120 hours exposure; with cycles of 4 hours UV and 4 hours condensation |
| D. | Salt Dot Test | A 1% (by weight) NaCl solution is applied to a filter paper square placed on the film side of the sample and the sample placed in a constant humidity environment for 24 hours |

Tests A, B, C, and D Sample Evaluations:

1. Selecting a representative area, 200x magnification photomicrographs are used to measure the defect area by the grid technique.* The defect score is calculated by the formula:
   Defect Score = 10–0.5 (% Defect Area)
2. To characterize corrosion of the metal layer, the emissivity of each sample is measured before and after the test.
   An emissivity score based upon change in emissivity is calculated using the following equation:
   Emissivity Score = 10 (Starting Emiss/Test Emiss)

Tests A, B, and C Sample Evaluations:

3. Measure of changes in film-side reflectance and color are made. (Note: due to heavy corrosion of the unprotected glass side in these test, it was not possible to make glass side reflectance or transmission comparisons after the test.)

| | | |
|---|---|---|
| E. | NH$_4$OH Test | Samples are immersed in a 0.5N solution of NH$_4$OH, at room temperature in a closed container, for 5 hours |
| F. | NaOH Base Test | Samples are immersed in a 0.1N solution of NaOH, at room temperature in a closed container, for 5 hours |
| G. | HCl Acid Test | Samples are immersed in a 0.1N solution of HCl, at room temperature in a closed container, for 5 hours |
| H. | H$_2$SO$_4$ Acid Test | Samples are immersed in a 0.1N solution of H$_2$SO$_4$, at room temperature in a closed container, for 5 hours |
| I. | HNO$_3$ Acid Test | Samples are immersed in a 0.1N solution of HNO$_3$, at room temperature in a closed container, for 5 hours |

Tests E, F, G, H, and I Samples were Evaluated by:

1. Selecting a representative area, 200x magnification photomicrographs are used to measure the defect area by the grid * technique. The defect score is calculated by the formula:
   Defect Score = 10 − 0.5 (% Defect Area)
2. Characterizing corrosion of the metal layer; the emissivity of each sample is measured. An emissivity score based upon change in emissivity is calculated using the following equation:
   Emissivity Score = 10 (Starting Emiss/Test Emiss)
3. Measuring the changes in transmission and both film- and glass-side reflectance and color.

| | | |
|---|---|---|
| J. | Taber Abrasion | Samples are subjected to a total of 50 revolutions on the Taber abrader, using the standard 500 gram weight and CS-10F wheels. |

Test J Samples Evaluation was Based On:

1. Selecting a representative area on the Tabered track, a photomicrograph is taken at 50x. Using this micrograph, 4 one inch square areas are marked off and the number of scratches in each square was counted. The scratch count for the 4 areas is averaged and this average number of scratches is put into the following equation, which yields a score of 0 for more than 55 scratches in a 1" square area, an 10 for none, according to the equation:
   Taber Score = 10 − [(Average # Scratches) × (0.18)]
2. The transmission is the abraded area is measured in four places and the results averaged. Using this average transmission, the change in transmission from the unabraded area is calculated.

Grid Technique * (as referred to in Tests A, B, C, and D sample evaluations)
A 10 × 10 grid with a spacing of 0.5 mm is randomly placed on the micrograph, each intersection point located within a defect is counted as 1. A point located on a boundary is counted as 0.5. A total score is kept for the grid placement, the process is repeated until the grid has been placed and counted 4 times. The % defect area is then given by:
% Defect Area = Total # of defect points/Total # of points (400) × 100

Although the invention has been described with respect to its preferred embodiments, it will be understood that the invention is to be protected within the full scope of the appended claims.

It is claimed:

1. A thin film interference filter comprising:

a transparent substrate;

a first substantially transparent dielectric layer comprising titanium dioxide;

a first metal precoat layer wherein said first metal precoat layer comprises a material selected from the group consisting of the combination of nickel with chromium and the combination of nickel with chromium nitride;

a partially reflective metal layer;

a second metal precoat layer comprising a mixture of nickel metal and chromium nitride; and a second substantially transparent dielectric layer.

2. The thin film interference filter as defined in claim 1 wherein the second dielectric layer comprises silicon nitride.

3. The thin film interference filter as defined in claim 2 wherein the partially reflective metal layer comprises silver.

4. The thin film interference filter as defined in claim 3 wherein the first dielectric layer has a refractive index of approximately 1.5 to 2.5.

5. The thin film interference filter as defined in claim 1 wherein the first metal precoat layer has a thickness of approximately 5 to 20 Å and the second metal precoat layer has a thickness of approximately 5 to 20 Å.

6. The thin film interference filter as defined in claim 5 wherein the partially reflective metal layer comprises silver and has a thickness of approximately 80 to 150 Å.

7. The thin film interference filter as defined in claim 6 wherein the first dielectric layer has a thickness of approximately 250 to 450 Å and the second dielectric layer has a thickness of approximately 300 to 500 Å.

8. The thin film interference filter as defined in claim 7 wherein the first metal precoat layer comprises nickel metal and chromium nitride and has a thickness of approximately 5 to 20 Å, wherein the second metal precoat layer has a thickness of approximately 5 to 20 Å, and wherein the silver metal layer has a thickness of 90 to 150 Å.

9. The thin film interference filter as defined in claim 1 wherein the second dielectric layer comprises a composite of silicon nitride and one or more other nitrides selected from the group consisting of zirconium nitride, titanium nitride, and hafnium nitride.

10. The thin film interference filter as defined in claim 9 wherein the partially reflective metal layer is a metal selected from the group consisting of silver, gold, copper, and platinum.

11. The thin film interference filter as defined in claim 10 wherein the first dielectric layer has a refractive index within a range of approximately 1.5 to 2.5.

12. The thin film interference filter as defined in claim 10 wherein the first metal precoat layer has a thickness of approximately 5 to 20 Å and the second metal precoat layer has a thickness of approximately 5 to 20 Å.

13. The thin film interference filter as defined in claim 12 wherein the metal layer has a thickness of approximately 90 to 150 Å.

14. The thin film interference filter as defined in claim 13 wherein the first dielectric layer has a thickness of approximately 250 to 450 Å and the second dielectric layer has a thickness of approximately 300 to 500 Å.

15. The thin film interference filter as defined in claim 14 wherein the second dielectric layer comprises approximately 50 to 100 percent by weight silicon nitride.

16. The thin film interference filter as defined in claim 15 wherein the first metal precoat layer comprises nickel and chromium nitride and has a thickness of approximately 5 to 20 Å, wherein the second metal precoat layer has a thickness of approximately 5 to 20 Å, and wherein the partially reflective metal layer comprises silver having a thickness of 90 to 150 Å.

17. A method for the production of a durable thin film interference filter on a transparent substrate comprising the steps, in sequence, of:

depositing a first substantially transparent dielectric layer comprising titanium dioxide onto said substrate;

depositing a first metal precoat layer wherein said first metal precoat layer comprises a material selected from the group consisting of the combination of nickel with chromium and the combination of nickel with chromium nitride;

depositing a partially reflective metal layer;

depositing a second metal precoat layer comprising a mixture of nickel metal and chromium nitride; and depositing a second substantially transparent dielectric layer.

18. The method for the production of a durable thin film interference filter as defined in claim 17 wherein the step of depositing the second metal precoat layer comprises the step of providing a magnetron having a nickel-chromium alloy target and reactively sputtering in an atmosphere containing nitrogen.

19. The method for the production of a durable thin film interference filter as defined in claim 18 wherein the first metal precoat layer comprises nickel and chromium nitride and wherein the step of depositing the first metal precoat layer comprises the step of providing a magnetron having a nickel-chromium alloy target and reactively sputtering in an atmosphere containing nitrogen.

20. The method for the production of a durable thin film interference filter as defined in claim 19 wherein the partially reflective metal layer comprises silver that is sputtered in an atmosphere containing nitrogen from a silver target of a magnetron.

21. The method for the production of a durable thin film interference filter as defined in claim 20 wherein the second dielectric layer comprises silicon nitride.

22. The method for the production of a durable thin film interference filter as defined in claim 21 wherein the first metal precoat layer has a thickness of approximately 5 to 20 Å and the second metal precoat layer has a thickness of approximately 5 to 20 Å.

23. The method for the production of a durable thin film interference filter as defined in claim 22 wherein the metal layer has a thickness of approximately 90 to 150 Å.

24. The method for the production of a durable thin film interference filter as defined in claim 23 wherein the silicon nitride second dielectric layer is deposited by:

(a) providing a cylindrical magnetron having a rotatable target comprising silicon and having magnetic means disposed at an angle of approximately 20° to 60° from normal relative to said substrate; and (b) moving said substrate towards the rotatable target so that dielectric material reactively sputtered in an atmosphere containing nitrogen is focused onto the substrate at an acute angle as the substrate approaches the target.

25. A method for the production of a durable thin film interference filter on a transparent substrate comprising the steps, in sequence, of:

depositing a first substantially transparent dielectric layer onto said substrate;

depositing a first metal precoat layer wherein said first metal precoat layer comprises a material selected from the group consisting of the combination of nickel with chromium and the combination of nickel with chromium nitride;

depositing a partially reflective metal layer;

depositing a second metal precoat layer comprising a mixture of nickel metal and chromium nitride; and depositing a second substantially transparent dielectric layer comprising the steps of:

(a) providing a cylindrical magnetron having a rotatable target and having magnetic means disposed at an angle of approximately 20° to 60° from normal relative to said substrate; and (b) moving said substrate towards the rotatable target so that dielectric material is reactively sputtered and focused onto the substrate at an acute angle as the substrate approaches the target.

26. The method for the production of a durable thin film interference filter as defined in claim 25 wherein the first dielectric layer comprises titanium dioxide or niobium oxide.

27. The method for the production of a durable thin film interference filter as defined in claim 25 wherein the first dielectric layer comprises a nitride selected from the group consisting of silicon nitride, titanium nitride, hafnium nitride, and zirconium nitride and wherein the first dielectric layer is deposited by:

(a) providing a cylindrical magnetron having a rotatable target comprising silicon and one or more metals selected from the group consisting of zirconium, titanium, and hafnium and having magnetic means disposed at an angle of approximately 20° to 60° from normal relative to said substrate; and (b) moving said substrate towards the rotatable target so that dielectric material reactively sputtered in an atmosphere containing nitrogen is focused onto the substrate at an acute angle as the substrate approaches the target.

28. The method for the production of a durable thin film interference filter as defined in claim 27 wherein the second dielectric layer comprises silicon nitride.

29. The method for the production of a durable thin film interference filter as defined in claim 25 wherein the second dielectric layer comprises silicon nitride.

* * * * *